US012270171B1

(12) United States Patent
Schuman

(10) Patent No.: US 12,270,171 B1
(45) Date of Patent: Apr. 8, 2025

(54) DRILL ATTACHMENT FOR DRIVING GROUND ANCHORS

(71) Applicant: Brian Schuman, Bushnell, FL (US)

(72) Inventor: Brian Schuman, Bushnell, FL (US)

( * ) Notice: Subject to any disclaimer, the term of this patent is extended or adjusted under 35 U.S.C. 154(b) by 0 days.

(21) Appl. No.: 18/410,436

(22) Filed: Jan. 11, 2024

(51) Int. Cl.
*E02D 13/00* (2006.01)
*B25F 3/00* (2006.01)
*E02D 5/80* (2006.01)
*E02D 7/22* (2006.01)

(52) U.S. Cl.
CPC ................ *E02D 13/00* (2013.01); *B25F 3/00* (2013.01); *E02D 5/801* (2013.01); *E02D 7/22* (2013.01)

(58) Field of Classification Search
CPC . E02D 13/00; E02D 5/801; E02D 7/22; B25F 3/00
See application file for complete search history.

(56) References Cited

U.S. PATENT DOCUMENTS 5,791,208 A * 8/1998 Grubbs ............... B25B 13/5091 81/125
6,374,707 B1 * 4/2002 Browning ........... B25B 13/5091 81/119
8,413,548 B2 * 4/2013 Redmond ................. B25B 9/00 408/80
2005/0132848 A1 * 6/2005 Tassano .............. B25B 13/5091 81/121.1

* cited by examiner

*Primary Examiner* — Nathaniel C Chukwurah

(57) ABSTRACT

A drill attachment for driving ground anchors includes a drill attachment assembly, a drill assembly, and a ground anchor assembly. The drill assembly has a drill with a chuck. The ground anchor assembly includes a ground anchor having an eyelet located on a distal end of the ground anchor. The drill attachment assembly includes an elongated rod having a hook disposed on a distal end. The hook of the drill attachment assembly is configured to be engaged to the eyelet of the ground anchor. The rod is configured to be received by the chuck of the drill to rotate the ground anchor.

20 Claims, 4 Drawing Sheets

DRILL ATTACHMENT FOR DRIVING GROUND ANCHORS

BACKGROUND OF THE INVENTION

1. Field of the Invention

The present invention relates to drill attachments and, more particularly, to a drill attachment for driving ground anchors that has an elongated rod with a hook to engage with a ground anchor.

2. Description of the Related Art

Several designs for drill attachments have been designed in the past. None of them, however, include a rod having a hook to engage the rod with the eyelet of a ground anchor.

Applicant believes that a related reference corresponds to U.S. Pat. No. 5,791,208 issued for a screw eye driving and removing device use with a drill. The applicant believes that another related reference corresponds to U.S. Pat. No. 6,374,707, issued for an eyebolt wrench that is configured to engage the eye portion of an eyebolt. None of these references, however, teach of a drill attachment for driving ground anchors comprising a drill accessory having an elongated rod with a hook member located on a distal end. The rod is configured to be received by a power drill, and the hook is used to engage and rotate a ground anchor.

Other documents describing the closest subject matter provide for a number of more or less complicated features that fail to solve the problem efficiently and economically. None of these patents suggest the novel features of the present invention.

SUMMARY OF THE INVENTION

It is one of the objects of the present invention to provide a drill attachment for driving ground anchors that allows the easy installation of ground anchors.

It is another object of this invention to provide a drill attachment for driving ground anchors that has a hook to easily be engaged to anchors for the installation of the anchors.

It is still another object of the present invention to provide a drill attachment for driving ground anchors that can be attached to a drill to make the installation of anchors more efficient.

It is yet another object of this invention to provide such a device that is inexpensive to implement and maintain while retaining its effectiveness.

Further objects of the invention will be brought out in the following part of the specification, wherein a detailed description is for the purpose of fully disclosing the invention without placing limitations thereon.

BRIEF DESCRIPTION OF THE DRAWINGS

With the above and other related objects in view, the invention consists in the details of construction and combination of parts, as will be more fully understood from the following description when read in conjunction with the accompanying drawings in which.

DETAILED DESCRIPTION OF THE EMBODIMENTS OF THE INVENTION

Figure 1:
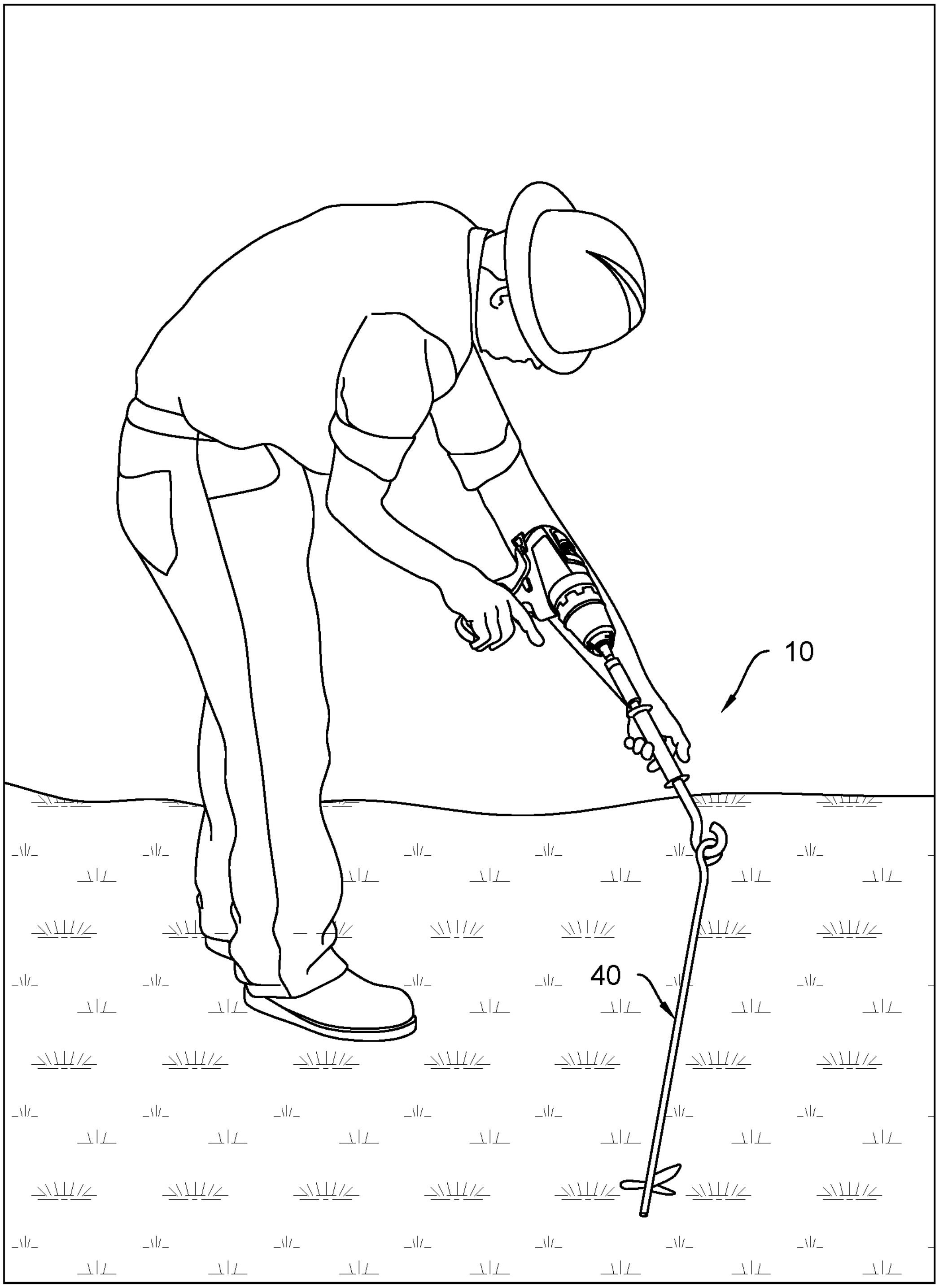
FIG. 1 represents an operational view of the present invention 10, showing a user installing a ground anchor assembly 40.

Referring now to the drawings, where the present invention is generally referred to with numeral 10, it can be observed that it basically includes a drill attachment assembly 20, a ground anchor assembly 40, and a drill assembly 60. It should be understood there are modifications and variations of the invention that are too numerous to be listed but that all fit within the scope of the invention. Also, singular words should be read as plural, and vice versa and masculine as feminine and vice versa, where appropriate, and alternative embodiments do not necessarily imply that the two are mutually exclusive.

The drill assembly 60 may include a drill 61 having a chuck 61*a* to receive different attachment tools. The chuck 61*a* may allow the receiving of tools of different suitable diameters therein. The chuck 61*a* may be any suitable drill chuck known in the art. Drill 61 may be an electric drill powered by batteries. It also may be convenient to have the drill 61 with an electricity cord connected to an electric outlet. It should be understood that drill 61 may be any suitable drill known in the prior art.

The drill assembly 60 may further include a tool adapter 62. The tool adapter 62 may have a first portion having a square prism shape or any other shape suitable to be received by the chuck 61*a*. The width of the first portion of the tool adapter 62 may be smaller than the width of the interior of the chuck 61*a*. The chuck 61*a* may have an interior with a variable width to receive and secure the tool adapter 62. A second portion of the tool adapter 62 may have a star-like shape having protrusions around an entire perimeter of the second portion of the tool adapter 62. It also may be suitable for the second portion of the tool adapter 62 to have other shapes such as cross, triangular, pentagonal, or any other suitable shape. In one embodiment, the second portion of the tool adapter 62 may have a greater diameter than the diameter of the first portion of the tool adapter 62.

Figure 4:
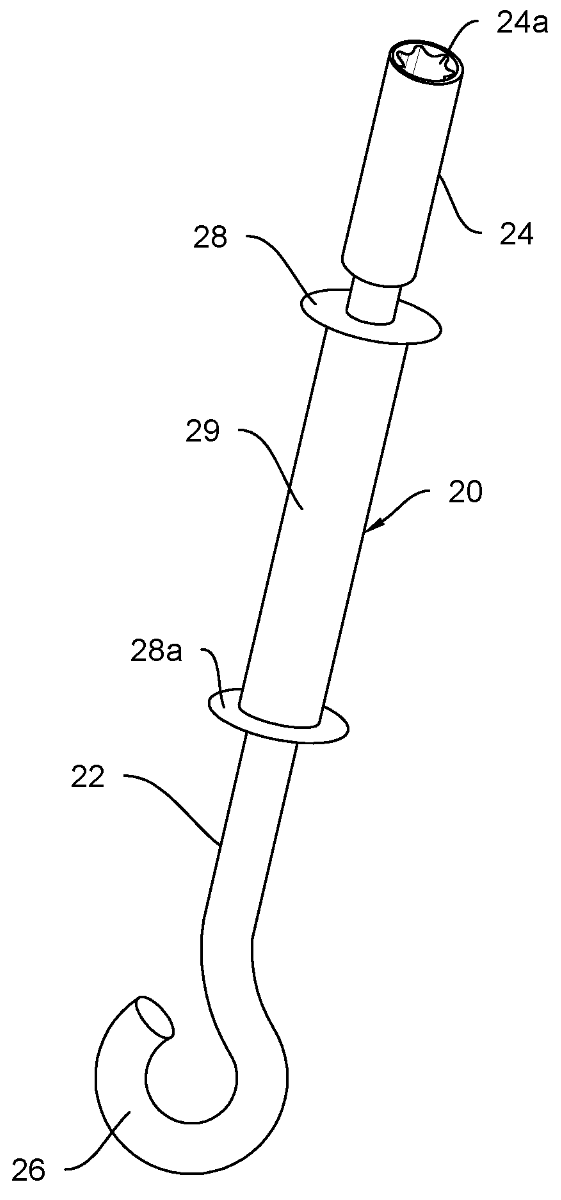
FIG. 4 is a representation of a rear isometric view of one of the preferred embodiments of the drill attachment assembly 20, showing the attachment receiving portion 24*a* of the drill attachment assembly 22.

The drill attachment assembly 20 may include a rod 22. In one of the preferred embodiments, rod 22 may have an elongated cylindrical shape. Other embodiments of the rod 22 may include other elongated shapes such as but not limited to triangular, rectangular, pentagonal, or any other suitable elongated shape. In one embodiment, the rod 22 may be made of steel. It should be understood that rod 22 may be made of any other material with good hardness and good strength to be resistant to fatigue and other failures. Covering rod 22 with a coating may also be suitable to prevent the rod from corrosion. As it can be noted in FIG. 4, the rod 22 may have a hook 26 located on a first distal end of the rod 22. In the present embodiment, hook 26 and rod 22 may be a unitary piece. Other embodiments of the drill attachment assembly 20 may include a hook 26 being removably attached to the rod 22, allowing hooks of different sizes and shapes to be engaged to different anchors or other tools.

The rod drill attachment assembly 20 may further include an attaching portion 24 located at a second distal end of the rod 22. The attaching portion 24 may have a cylindrical shape with a diameter similar to a diameter of the rod 22. It also may be suitable to have the attaching portion 24 having other suitable shapes such as square, triangular, pentagonal, or the like. The attaching portion 24 may have a distal end having a hole defining a receiving portion 24*a*. In the present embodiment, the receiving portion 24*a* may have a star-like shape having protrusions around the entire perimeter of an interior of the receiving portion 24*a*. It also may be suitable to have the interior portion of the receiving portion 24*a* with other shapes such as cross, triangular, pentagonal, or any other geometry suitable to be received by the tool adapter 62. A diameter of the interior portion of the receiving portion 24*a* may have a greater diameter than the tool adapter 62 in such a way that the receiving portion 24*a* of the attaching portion 24 may receive the second portion of the adapter 62.

The rod 22 may have a first protruding portion 28 and a second protruding portion 28*a*. The first protruding portion 28, and the second protruding portion 28*a*, may have a circular shape or any other suitable shape. The first protruding portion 28 may be located on a first predetermined distance from the attaching portion 28. The second protruding portion 28*a* may be located at a second predetermined distance from hook 26. The first protruding portion 28, and the second protruding portion 28*a*, may have a similar diameter. The first protruding portion 28 and the second protruding portion 28*a* may be separated by a predetermined distance defining a rod middle portion therebetween.

The drill attachment assembly 20 may further include a holding member 29. In a preferred embodiment, the holding member 29 may have a cylindrical shape. Other embodiments of the holding member 29 may include other suitable regular or irregular shapes. The holding member 29 may be an ergonomic hold member 29. In one of the preferred embodiments, the holding member 29 may be made of polyvinyl chloride. Other embodiments may include the hold member 29 being made of aluminum or any other suitable plastic, metal, or combination thereof. The holding member 29 may be hollow, having an interior diameter greater than the rod middle portion of the rod 22. The holding member 29 may be attached to the central portion of the rod 22.

The anchor assembly 40 may include an anchor 42. In one embodiment, the anchor 42 may have an elongated rod shape. A first anchor distal end of the anchor 42 may have an eyelet 44 located thereon. The eyelet 44 may have a circular shape. It also may be suitable for the eyelet 44 to have other suitable shapes as known in the art. A second anchor distal end of the anchor 42 may have an anchor head 46 with a plurality of blades protruding outwardly. The anchor 42 may be a ground anchor or any other suitable anchor.

Figure 2:
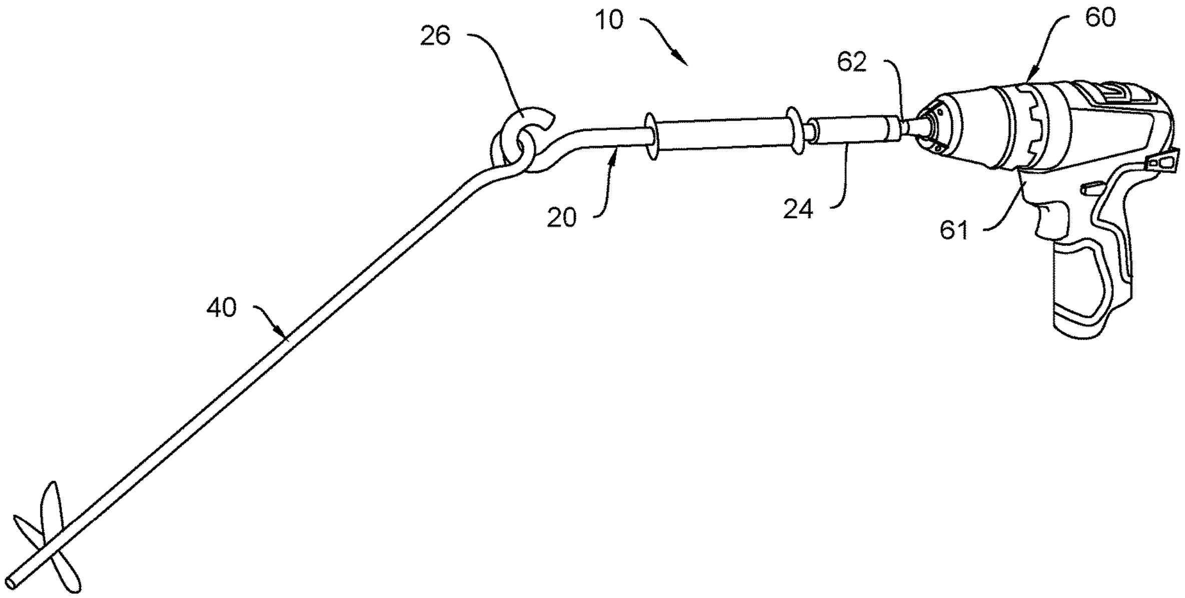
FIG. 2 shows an isometric view of the present invention 10, showing the drill attachment assembly 20 attached to the drill assembly 60 and the ground anchor assembly 40 attached to the drill attachment assembly 20.
Figure 3:
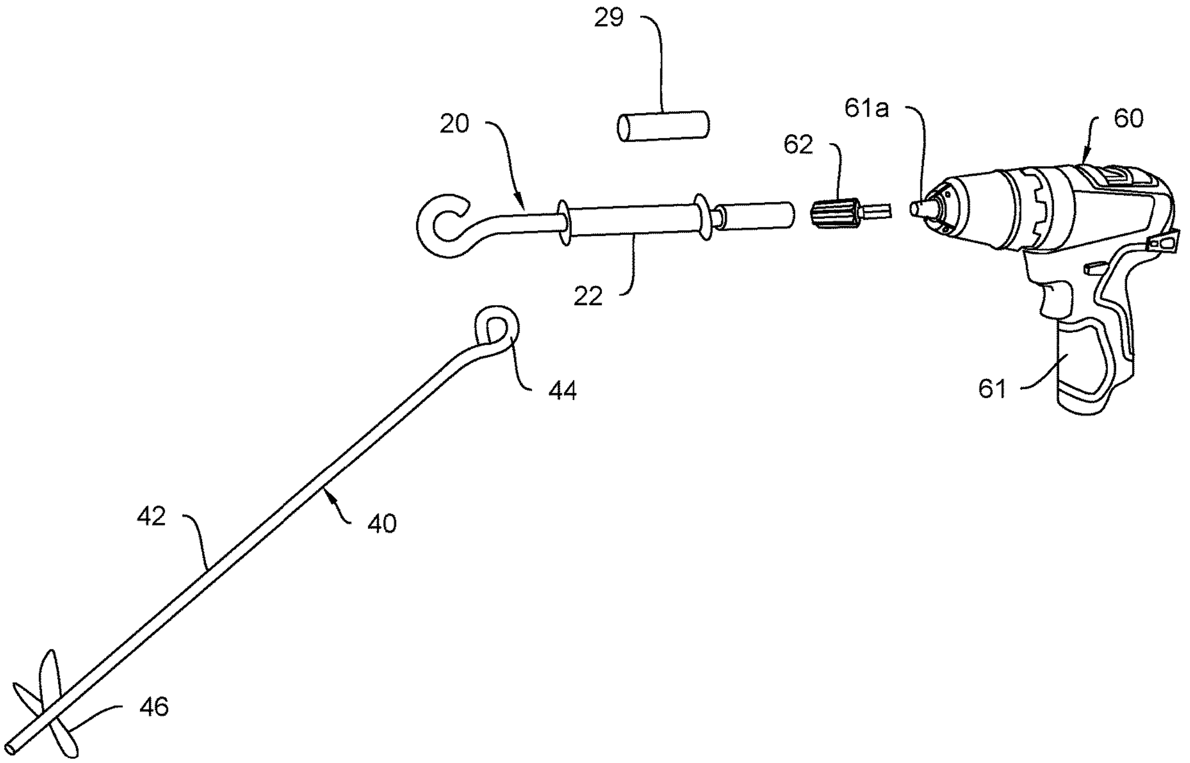
FIG. 3 illustrates an exploded view of the present invention 10, showing the drill attachment assembly 20, the drill assembly 60, and the ground anchor assembly 40.

Now, referring to FIG. 2, it can be noted that the tool adapter 62 is secured to the chuck 61*a* of the drill assembly 60. The tool adapter 62 is received by the attaching portion 24 of the attachment drill assembly 20. The hook 26 is engaged to the eyelet 44 of the anchor assembly 40. As can be observed in FIG. 1, the present invention 10 may be configured to allow a user to install an anchor assembly 40 on a portion of the ground. The hold member 29 may be configured to provide additional gripping support to the user to hold the present invention 10 while installing the anchor assembly 40 to the ground.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A drill attachment for driving ground anchors, comprising:

a) an anchor assembly having an anchor and an eyelet, wherein said eyelet is located at a first distal end of said anchor;

b) a drill assembly having a drill, wherein said drill has a chuck; and c) a drill attachment assembly including a rod, wherein said rod has a hook member located on a distal end of said rod, wherein said rod is removably inserted into the chuck of said drill, wherein the hook is removably engaged to the eyelet of the anchor to rotate said ground anchor.

2. The drill attachment for driving ground anchors set forth in claim 1, wherein said rod is an elongated rod.

3. The drill attachment for driving ground anchors set forth in claim 1, wherein said rod is made of steel.

4. The drill attachment for driving ground anchors set forth in claim 1, wherein said drill attachment assembly further includes a holding member.

5. The drill attachment for driving ground anchors set forth in claim 4, wherein said holding member has a cylindrical shape.

6. The drill attachment for driving ground anchors set forth in claim 4, wherein said holding member is attached to a middle portion of the rod.

7. The drill attachment for driving ground anchors set forth in claim 4, wherein said holding member is made of polyvinyl chloride.

8. The drill attachment for driving ground anchors set forth in claim 4, wherein said holding member is made of aluminum.

9. The drill attachment for driving ground anchors set forth in claim 1, wherein said drill assembly further includes a tool adapter being received and secured by said chuck.

10. The drill attachment for driving ground anchors set forth in claim 9, wherein said drill attachment assembly further includes an attaching portion having a hollow interior defining a receiving portion to receive the tool adapter therein.

11. The drill attachment for driving ground anchors set forth in claim 10, wherein said receiving portion has a star-like shape.

12. The drill attachment for driving ground anchors set forth in claim 1, wherein said anchor is a ground anchor.

13. A drill attachment for driving ground anchors, comprising:

a) an anchor assembly having a ground anchor and an eyelet, wherein said eyelet is located at a first distal end of said ground anchor;

b) a drill assembly having a drill, wherein said drill has a chuck, wherein said drill assembly further includes a tool adapter being received and secured by said chuck; and c) a drill attachment assembly including an elongated rod, wherein said rod has a hook member located on a distal end of said elongated rod, wherein said drill attachment assembly further includes an attaching portion having a hollow interior defining a receiving portion, wherein said receiving portion is removably connected to the chuck by means the tool adapter, wherein the hook is removably engaged to the eyelet of the anchor to rotate said ground anchor.

14. The drill attachment for driving ground anchors set forth in claim 13, wherein said drill attachment assembly further includes a holding member.

15. The drill attachment for driving ground anchors set forth in claim 14, wherein said holding member has a cylindrical shape.

16. The drill attachment for driving ground anchors set forth in claim 14, wherein said holding member is attached to a middle portion of the rod.

17. The drill attachment for driving ground anchors set forth in claim 14, wherein said holding member is made of polyvinyl chloride.

18. The drill attachment for driving ground anchors set forth in claim 14, wherein said holding member is made of aluminum.

19. The drill attachment for driving ground anchors set forth in claim 13, wherein said rod is an elongated rod made of steel.

20. A drill attachment for driving ground anchors, consisting of:

a) an anchor assembly having a ground anchor and an eyelet, wherein said eyelet is located at a first distal end of said ground anchor, said ground anchor has a second distal end having a plurality of blades protruding thereon;

b) a drill assembly having a drill, wherein said drill has a chuck, wherein said drill assembly further includes a tool adapter being received and secured by said chuck, wherein said tool adapter has a star-like shape; and c) a drill attachment assembly including a rod, wherein said rod is an elongated rod, wherein said rod is made of steel, wherein said rod has a hook member located on a distal end of said rod, wherein said drill attachment assembly further includes an attaching portion having a hollow interior defining a receiving portion, wherein said receiving portion has a star shape, wherein said receiving portion is removably connected to the chuck via the tool adapter, wherein the hook is removably engaged to the eyelet of the anchor to rotate said ground anchor, wherein said drill attachment assembly further includes a holding member, said holding member has a cylindrical shape, said holding member is hollow, said holding member is made of polyvinyl chloride, said holding member is attached to said rod.

* * * * *